Figure 1:
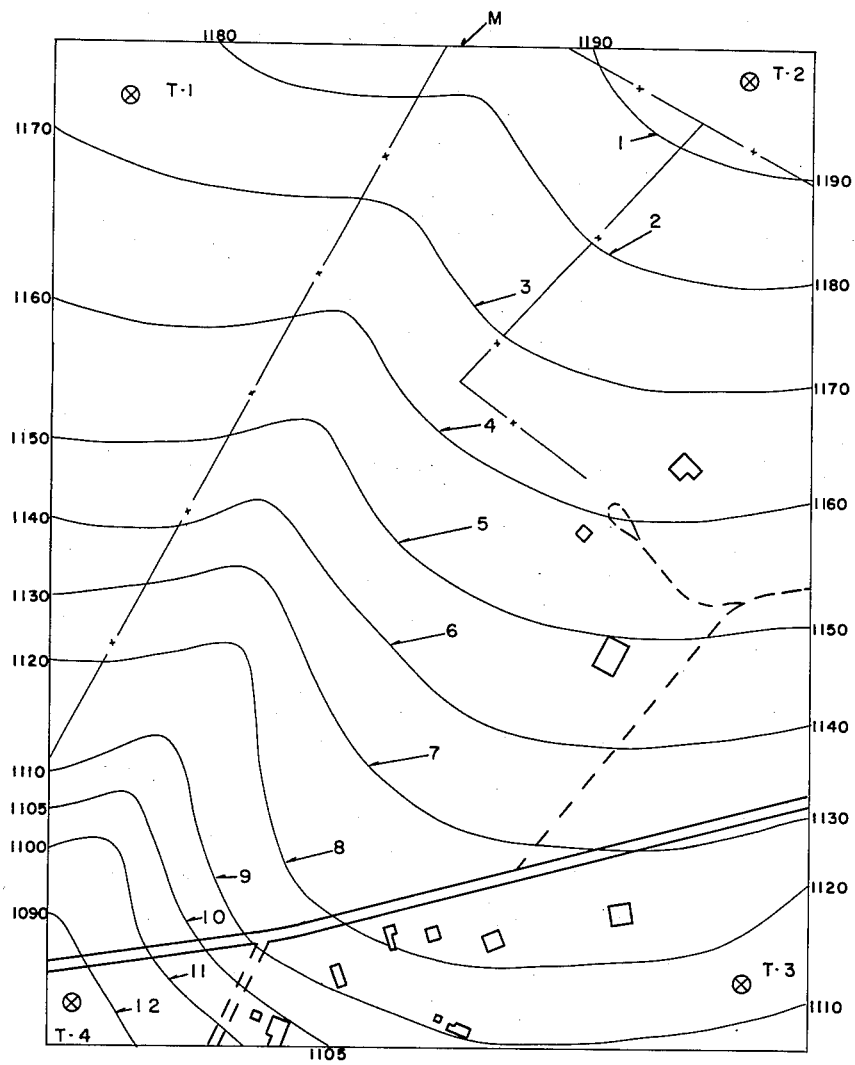

March 10, 1964

W. J. DIMOND 3,124,038

METHOD OF PLOTTING OUTCROP CONTOURS
OF SUB-SURFACE MINERAL DEPOSITS

Filed Oct. 25, 1962

3 Sheets-Sheet 1

INVENTOR.
Wm J. Dimond
BY
Smith Michael
and Gardiner

March 10, 1964

W. J. DIMOND 3,124,038

METHOD OF PLOTTING OUTCROP CONTOURS
OF SUB-SURFACE MINERAL DEPOSITS

Filed Oct. 25, 1962

3 Sheets-Sheet 3

INVENTOR.
Wm. J. Dimond
BY Smith, Michael
and Gardiner

United States Patent Office 3,124,038
Patented Mar. 10, 1964

3,124,038
METHOD OF PLOTTING OUTCROP CONTOURS OF SUB-SURFACE MINERAL DEPOSITS
William J. Dimond, 1941 Shady Oak Circle, Allison Park, Pa.
Filed Oct. 25, 1962, Ser. No. 233,030
11 Claims. (Cl. 88—24)

This invention relates generally to the art of photogrammetry and more particularly to a method of establishing the locus of outcropping contours of sub-surface mineral deposits.

The present invention has particular utility in making surveys of sub-surface mineral deposits for the purpose of determining the general position and extent of a mineral deposit as well as the amount of "overburden" covering the same. The invention may also be employed in making coal surveys and to accurately estimate the amount of "coal reserve" in the deposit. Heretofore, so far as is known, all methods used to determine these figures have involved the preparation of a map of the area in question on which have been inscribed surface contour lines showing graphically the topographic or surface irregularities of the area. Establishing these surface contour lines, whether accomplished by actual field survey work or by photogrammetry is tedious, time consuming and expensive.

The present invention has for its general object the provision of a simple and practical method of establishing the outcrop contour of a sub-surface mineral deposit and with an appreciable reduction in the cost thereof as compared with the known methods now in use.

More specifically, the present invention has for its object a method of the character described by which the locus of an underground mineral deposit and the outcropping contours thereof may be established without the necessity of preparing a surface contour map of the area in question.

Another object of the invention is to create by photogrammetric stereoscopic projection a three-dimensional image in space of the terrain in question and to transfer directly from this image to a map of the area in question, devoid of surface contour lines, points at which outcropping occurs or may occur.

Another object of the invention is to provide a method of the character described by which contour lines of a sub-surface mineral deposit may be depicted on a map of the area in question and to then transfer to these lines directly from a three-dimensional space image of the terrain, points at which outcropping of the sub-surface mineral deposit occurs or may occur.

Another object of the invention is to provide a method of the character described by which a map bearing only sub-surface contour lines of an underlying mineral deposit may be placed on a datum plane of a photogrammetric stereoscopic projection machine of the Kelsh type (see Patents 2,492,870 and 2,833,178) in which spaced diapositives of the terrain to be surveyed are projected stereoscopically onto said map to provide a three-dimensional image in space of the terrain to be surveyed, and then interposing a pickup screen between the projectors of the machine and said map and successively moving said pickup screen across the beams from said projectors parallel to said datum plane and at elevations above the datum plane corresponding in scale to the elevations represented by the respective elevation contour lines of said sub-surface mineral stratum on the map, and along paths following the delineations in said contour lines respectively, and transferring directly to the respective contour lines the points on the surface of the three-dimensional image which coincide in elevation to the successive planes of movement of the pickup screen.

Figure 2:
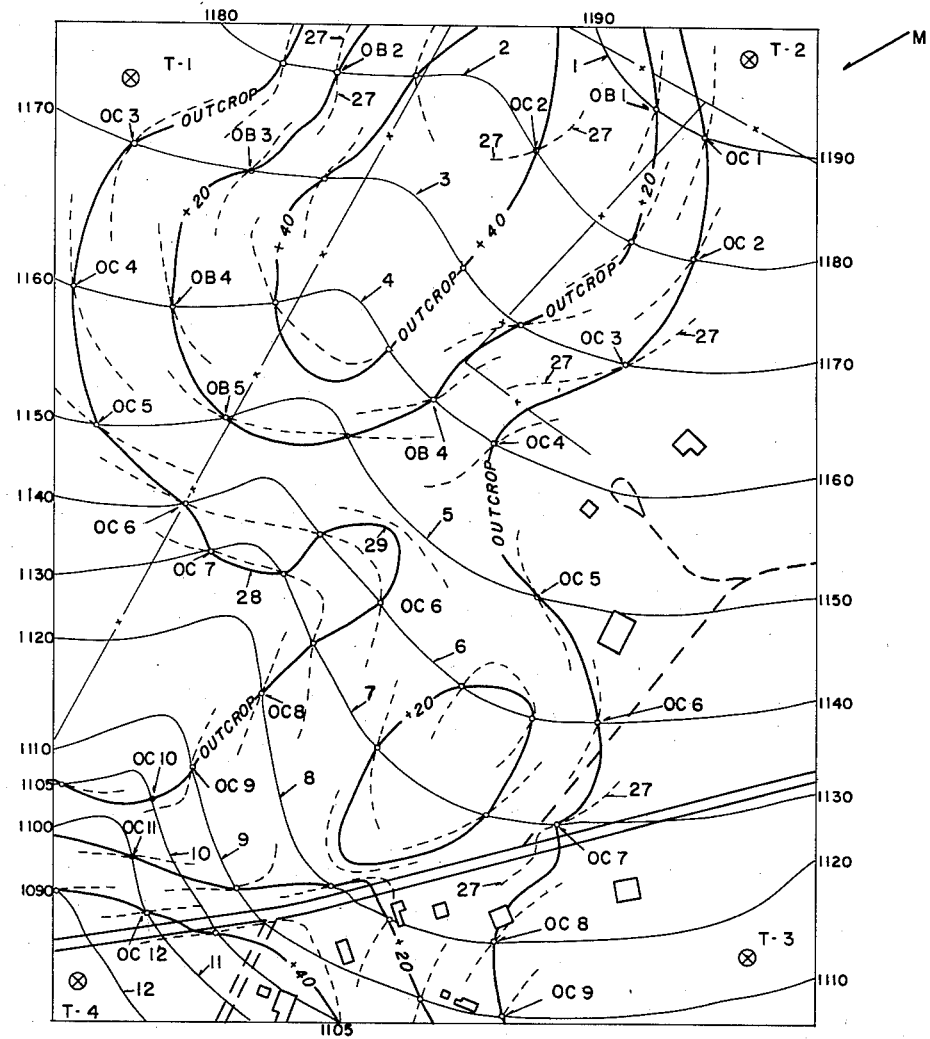

These and other objects of the invention will become apparent from reading the following specification in the light of the accompanying drawings, wherein:

FIG. 1 is a plan view of a map of an area to be surveyed having depicted thereon elevational contour lines of an underlying mineral deposit, and FIG. 2 is a plan view of the map of FIG. 1 after points of predetermined elevation have been transferred directly thereto from a three-dimensional image of the terrain in question, and said points connected to define the locus of the outcrop of said sub-surface mineral deposit.

Figure 3:
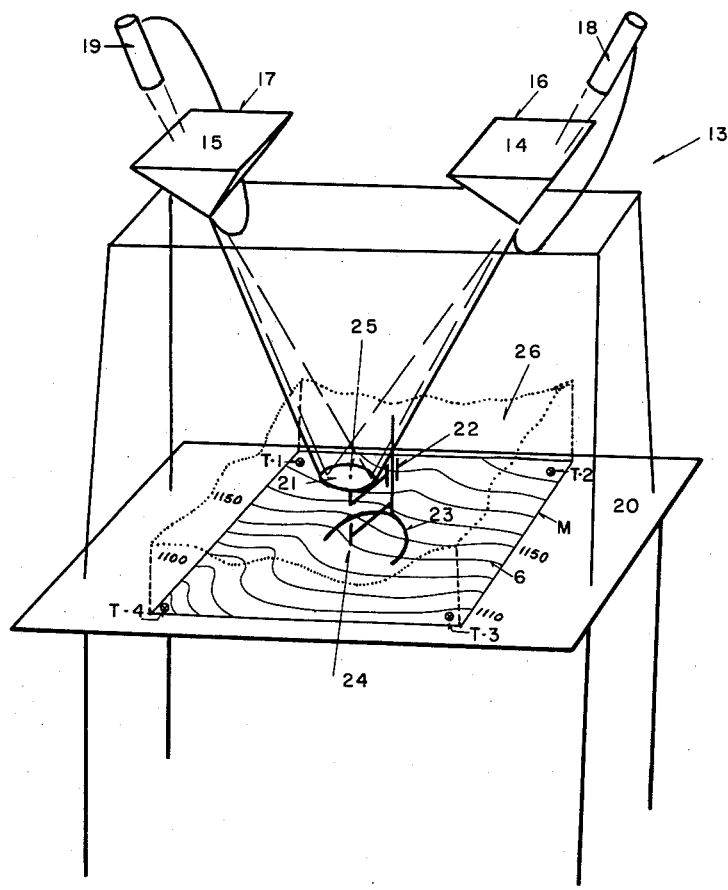

FIG. 3 is a diagrammatic representation of a Kelsh type photographic projection apparatus as used in the present method.

Referring more particularly to the drawings, FIG. 1 shows in plan, a map M of the area to be surveyed, devoid of any surface contour lines, but having depicted thereon lines 1 to 12 indicating the elevation above sea level of various points in the surface of an underlying mineral deposit. The loci of the elevation contour lines 1 to 12 of the sub-surface mineral deposit, may be established by known processes which generally involve making borings or diggings at strategic points of the area to be mapped or surveyed. These borings or diggings are made from the surface of the terrain vertically, downwardly into the sub-surface soil until the body of the mineral deposit in question, is encountered. Then, by comparison between the known elevation above sea level of the point at which a boring or digging was made, and the depth of the boring at which the sub-surface deposit was encountered, the actual elevation above sea level at the point of contact with the sub-surface mineral deposit may readily be ascertained. The elevation above sea level at various points on the surface of the sub-surface deposit having been thus obtained, contour lines 1 to 12 are drawn on the map of the area (see FIG. 1), the loci of such lines being determined by known processes of interpolation. On the map of FIG. 1 such elevations have been indicated arbitrarily in 10 feet increments running from 1190 feet for line 1, the line of highest elevation, to an elevation of 1090 feet for line 12, the line of lowest elevation, respectively.

As is well known in the art of photogrammetry, certain points on the surface of the terrain to be photographed are first identified by bench marks or targets visible from above, and the location and elevation of which are accurately determined. These bench marks or targets are represented on map M by the reference characters $T^1$, $T^2$, $T^3$ and $T^4$. It will be understood that the bench marks or targets $T^1$, $T^2$, $T^3$ and $T^4$ are located on the map M in scale accurately to correspond to the location of such targets on the terrain to be surveyed.

The area to be surveyed is now photographed from two spaced points above the terrain by a camera carried by an airplane, the photographs being taken at a known elevation and at a known distance apart and with the airplane flying a known course according to conventional practice. Diapositives are made of these photographs for projection in a photogrammetric machine of the Kelsh type (see Patents 2,492,870 and 2,833,178) such as shown at 13 in FIG. 3. The diapositives 14 and 15 of the photographs are mounted in the projectors 16 and 17 disposed in front of lights 18 and 19. The map M of FIG. 1 is deposited on the datum plane 20 of the machine. As is well known in the art of photogrammetry, the projectors 16 and 17 may be adjusted to dispose the diapositives 14 and 15 in scale, to the points in space from which the photographs were taken and when so adjusted, the targets or bench marks $T^1$–$T^4$ on the diapositives will appear on a projected image thereof on the datum plane in accurate registration with the similar identification marks appearing on the map M.

A mobile pickup screen shown at 21, a part of the Kelsh apparatus, is then interposed between the projectors and the map on the datum plane and is adjusted, by known mechanical means 22 to scale, to an elevation above the datum plane corresponding to that of one of the contour lines 1 to 12 which appear on the map M. For example, the pickup screen may be adjusted to scale at the elevation of 1140 feet above sea level corresponding to line 6 on map M. The pickup screen 21 is mounted on a plotting carriage 23 which carries a depending stylus 24 which is brought into registration with contour line 6 of the map M as shown in FIG. 3, and while maintaining the stylus 24 in a position to traverse the general contours or delineations of line 6, the plotting carriage is moved across and parallel to the datum plane 20. As is well known, the projection of the diapositives 14 and 15 as described will produce a three-dimensional stereoscopic image in space of the terrain of the original photographs and such image is indicated at 26 in FIG. 3. An index mark 25 carried by the screen 21 in known manner, and as the plotting carriage 23 is moved acros the dataum plane the index mark 25 coincides successively with points on the surface of the three-dimensional image 26 as increments of said image successively appear on said pickup screen, and these points of coincidence are transferred by the stylus 24 to the contour line 6. This procedure is repeated for each of the contour lines 1 to 12 on the map M at successive elevations corresponding respectively in scale to the elevations indicated by the contour lines 1 to 12 on the map M. The points may be designated O.C. points (outcrop points) and are clearly shown on the map of FIG. 2. It will be understood that the stylus 24 is in vertical alignment with the index mark 25.

When this operation has been completed the contour lines 1 to 12 of the map M of FIG. 1 will bear O.C. points as are shown in FIG. 2, where they are indicated by reference characters $O.C.^1$, $O.C.^2$, $O.C.^3$, $O.C.^4$, $O.C.^5$, $O.C.^6$, $O.C.^7$, $O.C.^8$, $O.C.^9$, $O.C.^{10}$, $O.C.^{11}$ and $O.C.^{12}$, the numerals in each instance indicating the elevation line on which they appear. These points will indicate respectively, the points at which those portions of the underlying deposit, the elevation of which is indicated by the respective contour lines, will break or "outcrop" the surface of the terrain in question. By joining corresponding O.C. points on the adjacent contour lines, the outcrop contour line, bearing legend OUTCROP of the underlying mineral deposit is graphically depicted. The outcrop line is established in the following manner.

As the O.C. points are located and marked on the respective sub-surface elevation contour lines on the map, dotted lines 27 are drawn preferably by the stylus 24 attached to the mobile screen carriage 23, laterally therefrom in opposite directions and towards the respective and next adjacent elevation lines while maintaining the index mark 25 on the screen in surface coincidence with the terrain as viewed on the screen 21. These dotted lines 27 are continued for a distance substantially one half of that which separates adjacent elevation lines in the vicinity of the point from which the lateral lines are drawn. When this operation has been completed these laterally extending lines 27 will appear on map M as shown in FIG. 2.

In instances where the terrain is characterized by relatively sharp or sudden depressions or elevations, such as a crevice or canyon, or a spur, successive O.C. points on the same elevation line may be joined by the "lateral lines" 27 lying on one side only of an elevation line, such as for example shown at 28 and 29 in FIG. 2.

When the lines 27 have been extended laterally from all of the O.C. points on the several elevation lines, the final outcrop contour line is drawn through the several O.C. points as shown by the solid line bearing legend OUTCROP, it being noted that those portions of said line falling between corresponding points on adjacent elevation lines, are, in respect to contour and direction, interpolated between the respectively adjacent lateral lines to provide a more realistic and generally smoothly curved outcrop contour line than would result from connecting the several O.C. points on the adjacent elevation lines by straight line segments.

In instances where it is desired to add to the map "overburden" contour lines, the operations just described are repeated for each elevation line but with the pickup screen in each instance set at an increased elevation corresponding to the elevation at which the overburden line is to be indicated. Thus, for example, if a 20 foot overburden line is to be shown, elevation line 6 representing a sub-surface stratum elevation of 1140 feet is traversed by the screen carriage 23 as before, but with the screen 21 set at an elevation of 1140 feet plus 20 feet, or at an elevation of 1160 feet and overburden points (O.B.) are then marked on elevation line 6 at points $O.B.^6$ where the index mark 25 on the screen 21 coincides with points on the surface of the three-dimensional image 26 of the terrain, as previously described. This operation is repeated for each of the elevation lines 1 to 12 with the screen 21 in each instance set at an elevation of 20 feet above the elevation of the respective elevation line, and the final O.B. contour line indicated by the legend OUTCROP plus 20 is then established in the same manner as described above in respect to the outcrop contour line, including the steps of drawing lines laterally from each O.B. point towards the next adjacent elevation lines lying on opposite sides thereof, and finally connecting corresponding O.B. points by a line which is interpolated, as described, between the lateral lines which have been drawn from the O.B. points, on adjacent contour lines 1 to 12. In FIG. 2 there is shown a second overburden line designated by legend OUTCROP plus 40, showing the overburden contour having an elevation of 40 feet above that of the outcrop contour line previously established.

It has been stated hereinbefore that the contour lines 1 to 12 indicating elevations above sea level of the surface of the sub-surface deposit are depicted on the map as shown in FIG. 1. These contour lines showing the elevation of the sub-surface deposit may be graphically inscribed on the map M as shown in FIG. 1 or they may be conveniently optically projected onto the map of FIG. 1 by inscribing these contour lines 1 to 12 in substantially opaque material on transparent overlays of substantially the size of the diapositives 14 and 15. These overlays (not shown) may be associated in superposed relation with the diapositives 14 and 15 in the projectors 16 and 17 in a Kelsh machine, so that the contour lines on said overlays will be projected onto the map M on the datum plane of the machine, when the stereoscopic image of the terrain is projected on the datum plane of such machine. Such transparencies are made in a known manner to scale and will bear the bench mark or target indicia represented in FIG. 1 by the reference characters $T^1$, $T^2$, $T^3$ and $T^4$, in order that they may be accurately placed in registration with the diapositives in the respective projectors. When operated in this manner the contour elevation lines inscribed on the transparencies will appear by optical projection on the map of FIG. 1 which, it will be understood, has been placed on the datum plane of the Kelsh machine.

It will be understood as a result of the foregoing description of my process that I have devised a method by which outcrop contour lines of a sub-surface mineral deposit may be determined and accurately depicted on the surface of a map devoid of surface contour lines. While I have described my process as particularly useful in determining the locus of outcrop contour of sub-surface mineral deposits it will be understood by those familiar with the art to which the invention relates that the same process may be utilized in calculating the "overburden" lying between a point of given elevation on the subsurface stratum and a point on the actual surface of the terrain vertically thereabove. Also, it will be appreciated that by ascertaining the thickness of a given deposit by conventional borings through said deposit, an accurate estimate of the bulk or "reserve" of the deposit may be calculated in a known manner.

Having thus described my invention what I claim as new is:

1. In the art of photogrammetric mapping, the method of establishing the loci of points indicating the outcropping contour of a sub-surface mineral stratutum underlying a given area of the earth's surface, on a map of said area devoid of surface contour lines, said method comprising depicting on a map of said area elevation lines indicating the elevation of various points in the surface of the sub-surface stratum, placing said map on a datum plane beneath a pair of stereoscopic projectors having therein diapositives of the area to be mapped, stereoscopically projecting a three-dimensional image on said datum plane of the diapositive images, disposing a pickup screen between the projectors and said datum plane, positioning the screen at an elevation corresponding to the elevation of a selected elevation line on the map, moving the screen in a plane parallel to the datum plane along a path corresponding in vertical projection to the contour of said selected elevation line, and inscribing directly on said selected elevation line by vertical projection points corresponding to the points of coincidence between the plane of the screen and the surface delineations of the three-dimensional stereoscopic image as the screen is moved along said path and then repeating the operations of the last three steps in connection with the other elevation lines on the map.

2. In the art of photogrammatic mapping, the method of producing outcropping contour lines of a sub-surface stratum underlying a given area of the earth's surface on a map of said area devoid of surface contour lines comprising depicting on a map of said area elevation lines indicating the elevation of various points in the surface of the sub-surface stratum, placing said map on a datum plane beneath a pair of stereoscopic projectors having therein diapositives of the area to be mapped, stereoscopically projecting a three-dimensional image on said datum plane of the diapositive images, disposing a pickup screen between the projectors and said datum plane, positioning the screen at an elevation corresponding to the elevation of a selected elevation line on the map, moving the screen in a plane parallel to the datum plane along a path corresponding in vertical projection to the contour of said selected elevation line, and inscribing directly on said selected elevation line by vertical projection points corresponding to the points of coincidence between the plane of the screen and the surface delineations of the three-dimensional stereoscopic image as the screen is moved along said path and then repeating the operations of the last three steps in connection with the other elevation lines on the map, and successively drawing lines from the points on one elevation line in opposite directions therefrom towards the corresponding points on the next adjacent line of higher elevation and towards the next adjacent line of lower elevation to form a continuous line indicating the outcrop contour of said sub-surface mineral stratum.

3. In the art of photogrammetry, the steps of providing a map of an area to be surveyed, said map bearing elevational contour lines of sub-surface mineral deposit, supporting said map in substantially horizontal position, creating, at a point above said map, a three-dimensional image in space of the terrain to be surveyed, successively cutting said image by planes generally parallel to the plane of the map and at elevations corresponding in scale to the respective elevations of the contour lines on the map and transferring by vertical projection directly onto the sub-surface mineral stratum contour lines of the map respectively, outcrop points corresponding to points of coincidence between said respective planes and the surface of said three-dimensional image.

4. The method described in claim 3, including the step of joining said outcrop points by a line extending through corresponding outcrop points on the several sub-surface mineral stratum contour lines.

5. In the art of photogrammetric mapping, the method of establishing a locus of the outcrop contour line of a sub-surface mineral deposit underlying an area to be surveyed, comprising providing a map of the area to be surveyed having depicted thereon elevational contour lines of said sub-surface stratum, placing said map in coplanar position on a datum plane beneath a pair of stereoscopic projectors containing stereoscopic diapositives of the surface to be surveyed, creating by stereoscopic projection in the space above said datum plane a three-dimensional stereoscopic image on said datum plane, moving a pickup screen across the datum plane in spaced relation to the map thereon and in a plane parallel to said datum plane and at successive elevations corresponding in scale to the elevations depicted by said elevation contour lines of said sub-surface mineral stratum on said map, conforming the successive movements of the pickup screen across said datum plane to paths corresponding respectively to that of said elevation contour lines of said sub-surface mineral stratum, and transferring directly to said respective contour lines by downward vertical projection, points on the surface of the three-dimensional image which coincide in elevation to the plane of movement of the pickup screen on a given traverse of said datum plane thereby, and then joining corresponding points on said several elevation contour lines of said sub-surface mineral stratum to graphically indicate the outcropping contour of said sub-surface mineral deposit.

6. In the art of photogrammetry, the method of establishing the outcropping contours of a sub-surface mineral stratum comprising providing a map of the area to be surveyed, disposing said map in coplanar relation and depicting thereon by optical projection a series of lines representing the respective elevations of several spaced points within the sub-surface mineral deposit to be surveyed, creating above said map and in scale registration therewith a three-dimensional stereoscopic image of the area to be surveyed, successively intersecting said image with planes parallel to the plane of the map and disposed at scale elevations corresponding respectively to the elevations of said several points in said sub-surface mineral stratum as depicted on the map by said elevation lines, and then transferring directly to the corresponding elevation lines on the map from said three-dimensional image the points on the surface of said image which coincide in elevation with the respective elevations of the lines on said map, and then joining corresponding points on adjacent lines of elevation by a line passing through said corresponding points to complete the outcrop contour of the sub-surface mineral stratum.

7. The method recited in claim 6 wherein the outcrop contour line joining said outcrop points on the several elevation lines is formed by drawing lines on the map laterally from each such outcrop point in opposite directions therefrom and toward the next adjacent elevation line of higher and of lower elevations respectively for approximately one half the distance between adjacent contour lines, and then joining corresponding outcrop points on adjacent elevation lines by a line which, between outcrop points on adjacent elevation lines is interpolated as to direction and contour in respect to those laterally extending lines which have been drawn from each of said outcrop points towards the other.

8. The method recited in claim 7 wherein the outcrop contour line joining said outcrop points on the several elevation lines is formed by drawing lines on the map by a stylus disposed in vertical alignment with said index mark laterally from each such outcrop point in opposite directions therefrom and toward the next adjacent elevation line of higher and of lower elevations respectively for approximately one half the distance between adjacent contour lines while maintaining said index mark in coincidence with portions of the surface of the terrain appearing on said screen which are of equal elevation with that of the screen, and then joining corresponding outcrop points on adjacent elevation lines by a line which, between outcrop points on adjacent elevation lines is interpolated as to direction and contour in respect to those laterally extending lines which have been drawn from each of said outcrop points towards the other.

9. The method of plotting outcrop contours of a subsurface mineral stratum comprising photographing the terrain overlying said sub-surface mineral stratum from two spaced points above the terrain, placing the diapositives of said photographs in stereoscopic projectors oriented in scale to the positions in space from which said photographs were taken, projecting the images of said diapositives onto a datum plane to thereby create a three-dimensional stereoscopic image of said terrain, interposing a pickup screen bearing an index mark between the projectors and said datum plane in a position to intercept the rays from said projectors, placing a map of the terrain on said datum plane, said map bearing a series of lines representing elevations of various points on the surface of said sub-surface mineral stratum, adjusting said pickup screen to an elevation above said datum plane corresponding to the elevation of a selected elevation line on the map, moving the pickup screen across the datum plane parallel to the plane thereof and along a path corresponding to said selected elevation line, and indicating by outcrop marks on said selected elevation line points of coincidence between the index mark on the screen and points on the surface of said three-dimensional image as the pickup screen is moved across the datum plane, repeating the last three recited steps for each elevation line on the map, and then completing the outcrop contour line by joining corresponding identifying marks on adjacent elevation lines.

10. The method described in claim 8 wherein the elevation lines on said map are optically projected thereon by placing a transparency bearing said elevational lines of the sub-surface mineral stratum in each of said projectors and simultaneously projecting said lines and said images onto said datum plane.

11. The method of plotting the overburden contour lines of a sub-surface mineral stratum underlying a given area of the earth's surface on a map of said surface area, devoid of surface contour lines, which method comprises photographing the terrain overlying said sub-surface mineral stratum from two spaced points above the terrain, placing the diapositives of said photographs in stereoscopic projectors oriented in scale to the positions in space from which said photographs were taken, projecting the images of said diapositives onto a datum plane to thereby create a three-dimensional stereoscopic image of said terrain, interposing a pickup screen bearing an index mark between the projectors and said datum plane in a position to intercept the rays from said projectors, placing a map of the terrain on said datum plane, said map bearing a series of lines representing elevations of various points on the surface of said sub-surface mineral stratum, adjusting said pickup screen to an elevation above said datum plane corresponding to the elevation of a selected elevation line on the map, moving the pickup screen across the datum plane parallel to the plane thereof and along a path corresponding to said selected elevation line, and indicating by outcrop marks on said selected elevation line points of coincidence between the index mark on the screen and points on the surface of said three-dimensional image as the pickup screen is moved across the datum plane, repeating the last three recited steps for each elevation line on the map, and then completing the outcrop contour line by joining corresponding identifying marks on adjacent elevation lines, then setting the pickup screen at an elevation in excess of the elevation of a given contour line by an amount corresponding to the elevation of the overburden line to be indicated, and moving the screen across the datum plane at said elevation and along a path corresponding to that above which the screen is positioned, and indicating on said elevation line overburden marks indicating points at which the index mark on the screen coincides with the points on the surface of said three-dimensional image as the pickup screen is moved across the datum plane, and then repeating the last three recited steps for each elevation line on the map, and then completing the overburden line by joining corresponding overburden points on adjacent elevation lines.

No references cited.